(12) United States Patent
Seiferling

(10) Patent No.: US 6,289,269 B1
(45) Date of Patent: Sep. 11, 2001

(54) VEHICLE GUIDANCE SYSTEM

(75) Inventor: James Edward Seiferling, Rio Vista, CA (US)

(73) Assignee: Barrier Systems, Inc., Rio Vista, CA (US)

( * ) Notice: Subject to any disclaimer, the term of this patent is extended or adjusted under 35 U.S.C. 154(b) by 0 days.

(21) Appl. No.: 09/710,355

(22) Filed: Nov. 9, 2000

(51) Int. Cl.$^7$ ................................ G05D 1/00; B62D 1/24
(52) U.S. Cl. ............................ 701/23; 180/167; 180/168
(58) Field of Search ........................... 701/23, 24, 200; 318/587; 180/167, 168, 169

(56) References Cited

U.S. PATENT DOCUMENTS

| | | | |
|---|---|---|---|
| 5,175,480 | * | 12/1992 | McKeefery et al. ............... 318/587 |
| 5,404,087 | * | 4/1995 | Sherman ............................. 318/587 |
| 5,938,704 | * | 8/1999 | Torii ..................................... 701/23 |

* cited by examiner

Primary Examiner—William A. Cuchlinski, Jr.
Assistant Examiner—Yonel Beaulieu
(74) Attorney, Agent, or Firm—Thomas R. Lampe

(57) ABSTRACT

A system for use in guiding a vehicle on a roadway along an elongated guide member emitting a magnetic field includes an upper sensor and a lower sensor connected to the vehicle. The lower sensor detects a magnetic field emitted by the elongated guide member and an ambient magnetic field. The upper sensor detects only the ambient magnetic field. The signals produced by the detectors are processed to subtract the signal from the upper sensor of that of the lower sensor to produce a steering signal for transmission to an automatic steering system on the vehicle.

18 Claims, 6 Drawing Sheets

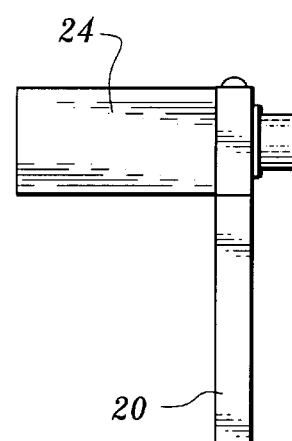
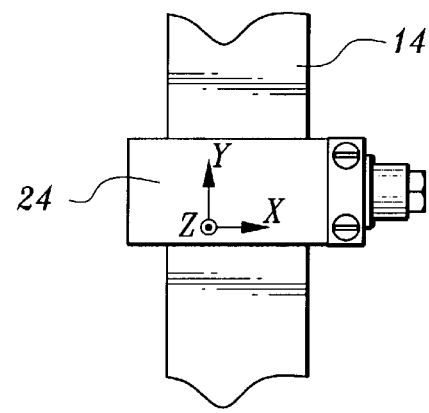
Fig. 2
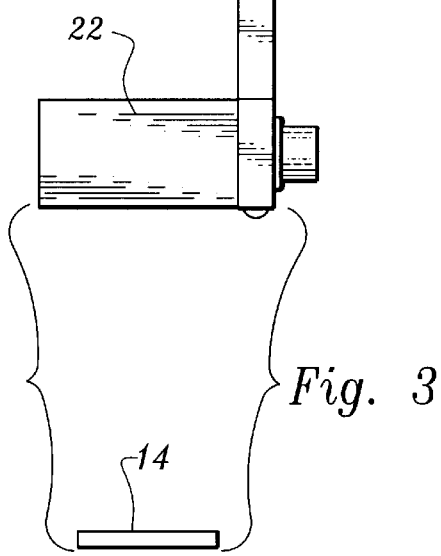
Fig. 3
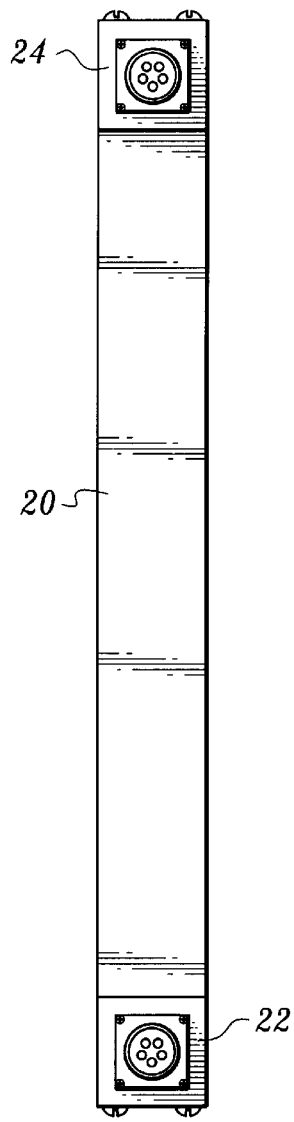
Fig. 5

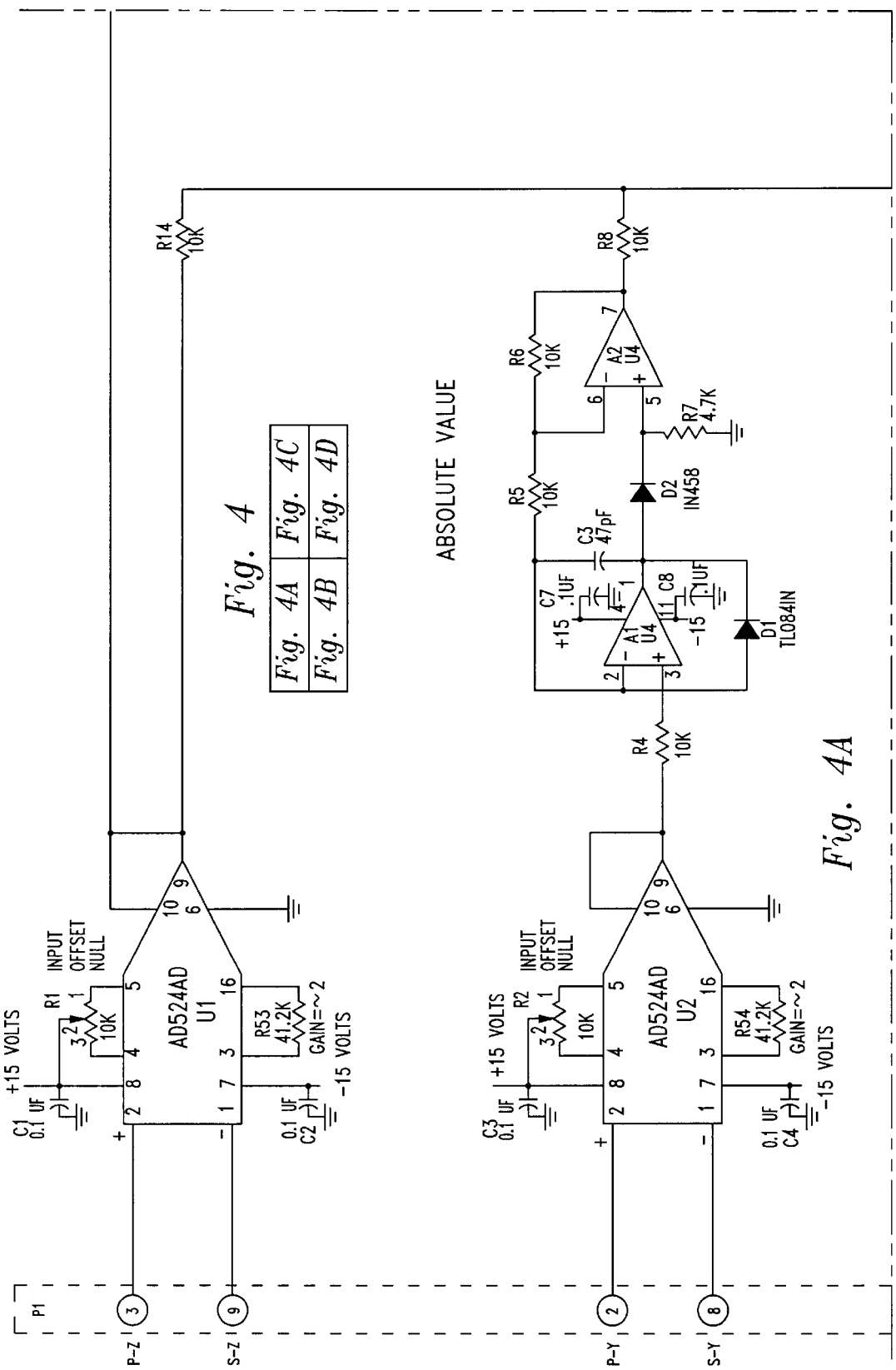

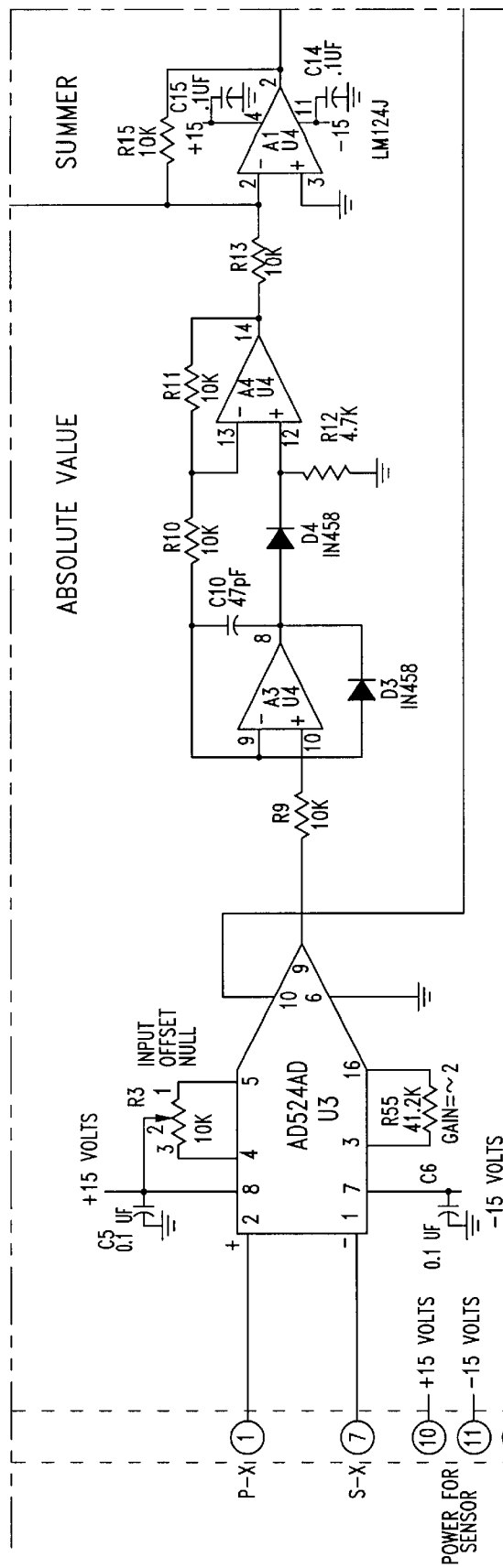
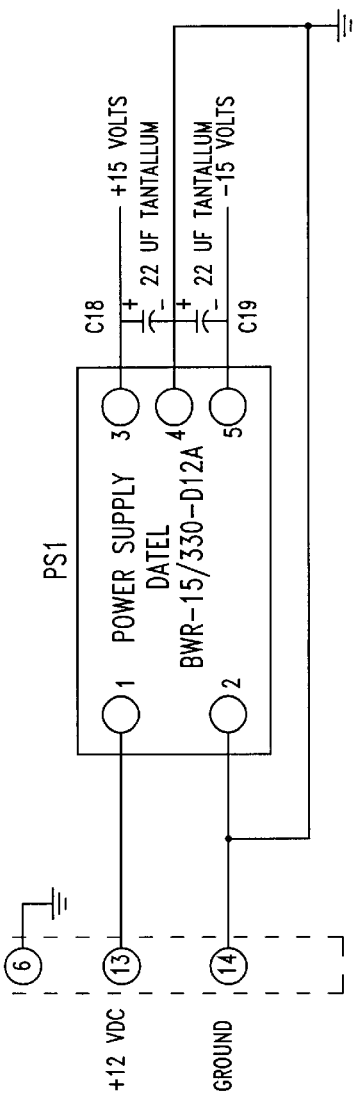
Fig. 4B

VEHICLE GUIDANCE SYSTEM

TECHNICAL FIELD

This invention relates to vehicle autoguidance systems and more particularly to an apparatus and a method for use in guiding a vehicle on a roadway along an elongated guide member emitting a magnetic field.

BACKGROUND OF THE INVENTION

It is well known to employ the magnetic field of a member or members associated with a roadway to guide vehicles having an automatic steering system. It is also known to employ a guidance wire system associated with a roadway that emits a radio signal which is picked up by an antenna on a vehicle and processed by an onboard computer that controls vehicle steering.

Although autoguidance systems employing radio frequency wires are satisfactory in many respects, they do have significant disadvantages. For example, power must be supplied to the wire, not always feasible in remote areas. Furthermore, RF wire guide systems require use of a continuous wire loop in or on the roadway and each loop must be associated with its own power supply source or sources. Such arrangements are quite expensive and prone to damage; for example, a lightning strike at or near an RF wire installation can knock out the system.

Magnetic vehicle autoguidance systems also have a number of limitations. According to this approach, either spaced magnetic field emitters or elongated elements such as magnetic tape are positioned at the roadway and the magnetic field or fields emitted thereby are sensed and a resultant signal produced to control a vehicle automatic steering system.

In order to sense the magnetic field of the tape a sensor must be placed in very close proximity thereto. Not only is the magnetic field of the tape relatively weak, the sensor picks up an ambient magnetic field including that produced by the earth itself. This problem becomes even more aggravated if bridges or other metal structures are in the vicinity.

Because of road irregularities or other factors, it is often difficult or even impossible to maintain the position of a sensor on a vehicle very close to the road surface, as presently required to pick up weak magnetic signals produced by available magnetic tapes and distinguish them from ambient magnetic fields.

Wide magnetic tapes has been utilized in an attempt to strengthen the magnetic guidance field, however such an approach is not only expensive but provides only a partial solution to the problem of ambient or extraneous magnetic fields interfering with operation of the autoguidance system.

DISCLOSURE OF INVENTION

The present invention relates to a system which allows use of a magnetic tape having a very weak field (which may for example be similar in strength to the earth's field strength) to be utilized in a vehicle autoguidance system. A relatively narrow magnetic tape (in the order of two inches wide, for example) can be utilized. In addition, the sensor employed to detect the magnetic field emitted thereby can be maintained a significant distance, e.g. six inches or more, from the roadway so that roadway irregularities or objects on the roadway will not interfere with proper operation of the system.

The present invention even makes it feasible to use a magnetic tape embedded in a roadway beneath the roadway surface to provide a magnetic guide field.

The apparatus of the invention is for use in guiding a vehicle on a roadway along an elongated guide member emitting a magnetic field.

The apparatus includes a first sensor attached to the vehicle for detecting both the magnetic field emitted by the elongated guide member and an ambient magnetic field not emitted by the elongated guide member.

The first sensor produces a primary signal representative of the detected magnetic field emitted by the elongated guide member and the ambient magnetic field.

A second sensor is attached to the vehicle for detecting the ambient magnetic field but not a substantial portion of the magnetic field emitted by the elongated guide member.

The second sensor produces a reference signal representative of the ambient magnetic field.

A signal processor processes the primary and reference signals to subtract the reference signal from the primary signal and produce a steering signal for transmission to the automatic steering system on the vehicle.

The present invention also encompasses a method.

Other features, advantages, and objects of the present invention will become apparent with reference to the following description and accompanying drawings.

BRIEF DESCRIPTION OF DRAWINGS

FIG. 2 is a top plan view illustrating a sensor positioned over the magnetic tape;

FIG. 3 is a side elevational view of two sensors incorporated in the apparatus held by a support member above the magnetic tape;

FIGS. 4 and 4A–4D illustrate a detailed electrical circuit diagram, FIGS. 4A–4D illustrating different segments thereof and FIG. 4 illustrating the overall relationship of such segments; and FIG. 5 is a rear elevational view of the sensors and support.

BEST MODE FOR CARRYING OUT THE INVENTION

Figure 1:
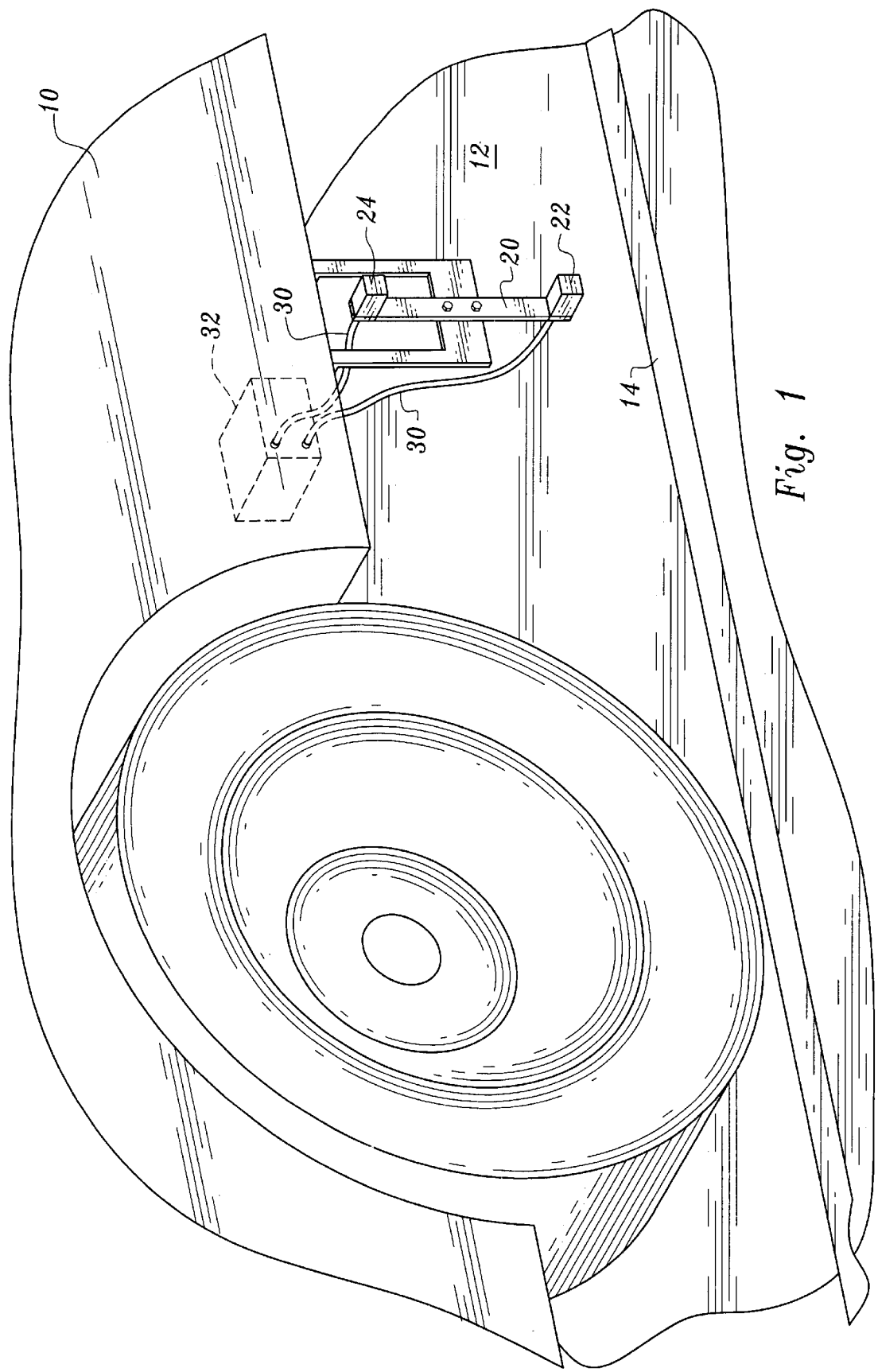
FIG. 1 is a perspective view illustrating a portion of a vehicle on a roadway having a magnetic tape thereon and apparatus constructed in accordance with the teachings of the present invention attached to the vehicle.
Figure 4C:
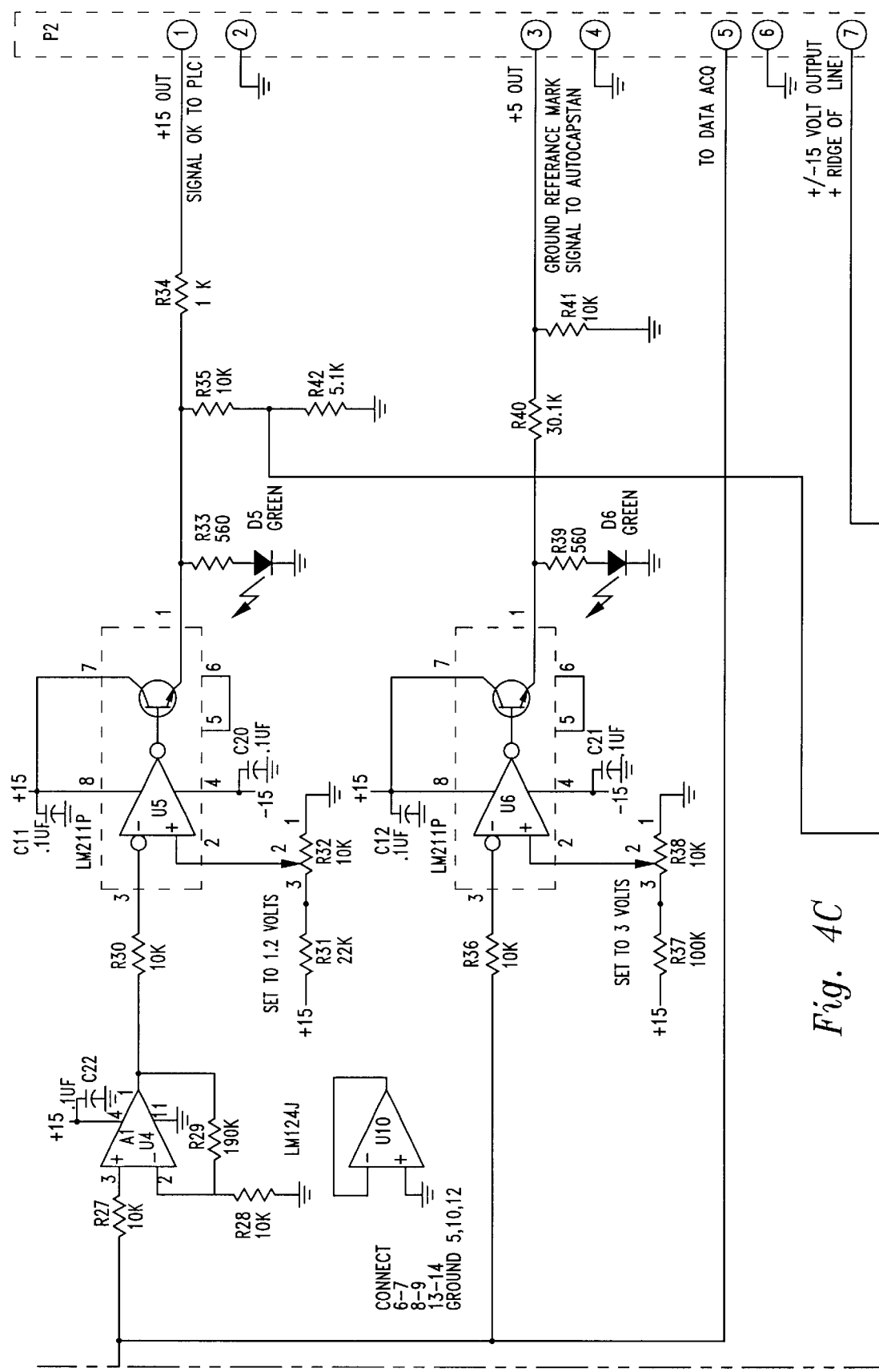
Figure 4D:
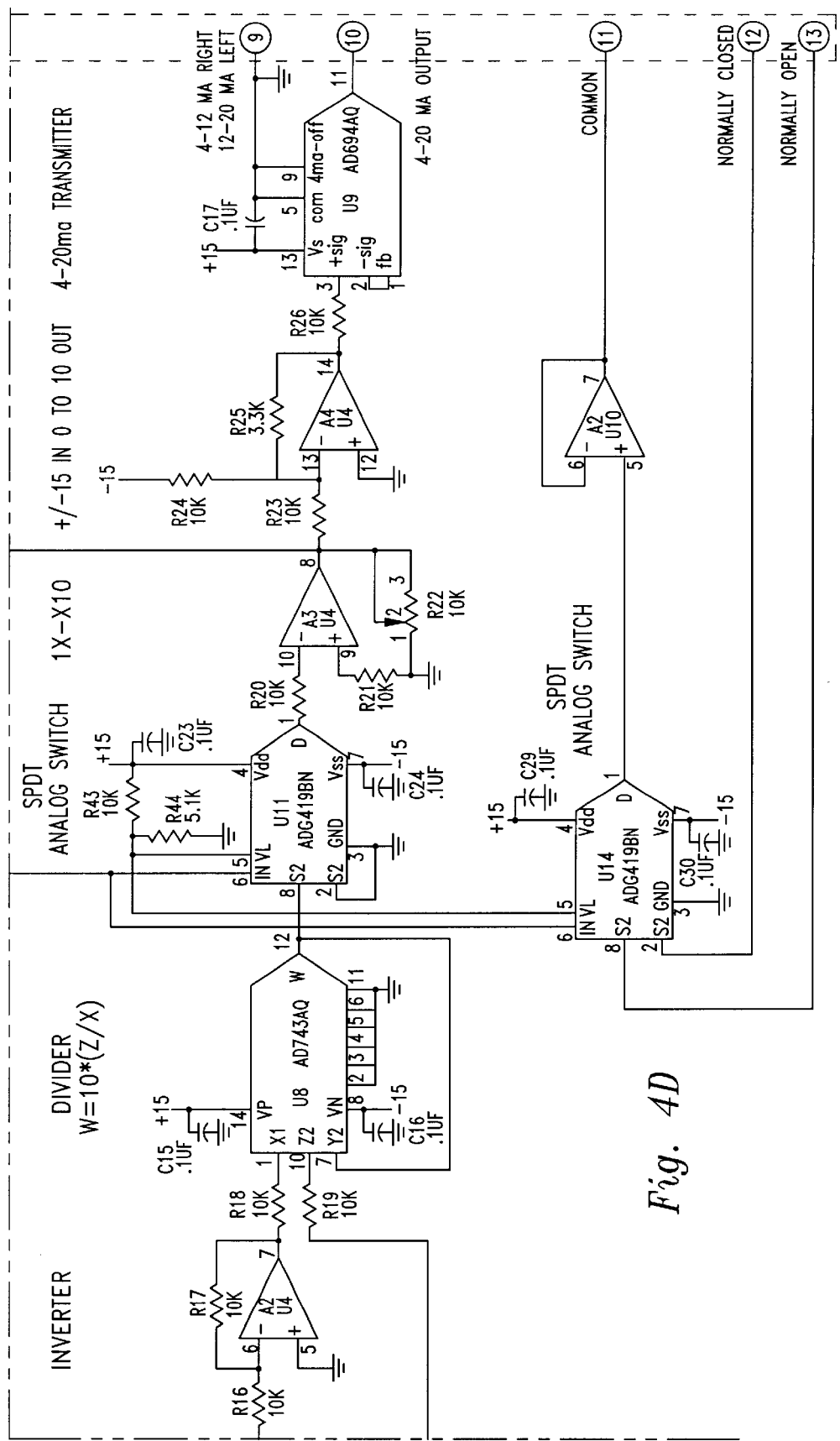

FIG. 1 illustrates a portion of a wheeled vehicle 10 on a roadway 12 having an elongated guide member in the form of magnetic tape 14 applied to the surface thereof.

Referring now to FIGS. 1–3 and 5, a support 20 is attached to the vehicle, the support 20 supporting sensors 22, 24. The sensors 22, 24 are fluxgate magnetometers, a suitable magnetometer being Model APS535, manufactured by Applied Physics Systems, Mountain View, Calif. The sensors 22, 24 are spaced from one another and stacked vertically. The sensors are elevated relative to the tape 14 and sensor 24 is elevated relative to sensor 22. The sensors are aligned along a vertical axis.

Magnetic tape typically has a very weak field and sensor 24 is sufficiently elevated that it does not detect the magnetic field emitted by tape 14. However, sensor 24 does detect the earth's field strength or other contributors to the ambient magnetic field.

The sensor 22, on the other hand, is positioned close enough to the magnetic tape 12 to detect the magnetic field emitted thereby. Of course, sensor 22 also detects the same or essentially the same ambient magnetic field detected by sensor 24.

To accomplish the objectives just noted, the sensor 22 may be disposed about six inches from the magnetic tape and the two sensors are separated vertically, suitably about twelve inches or so. The precise spacing and positioning of the sensors will depend of course on the strength of the field produced by the magnetic tape as well as possible other factors. The objective is to place the upper sensor high enough above the magnetic tape that it does not detect the tape field but only the ambient magnetic field.

Sensor 22 produces a primary signal representative of the detected magnetic field emitted by the tape 14 and the ambient magnetic field. Sensor 24, on the other hand, produces a reference signal representative of the ambient magnetic field only.

These primary and reference signals are delivered via wiring 30 to a signal processor 32 on the vehicle which processes the primary and reference signals to subtract the reference signal from the primary signal and produce a steering signal for transmission to an automatic steering system (not shown) on the vehicle.

The automatic steering system does not comprise a part of the present invention. It is to be understood that such steering systems are well known and can be utilized in vehicles which perform operations based on a sensed voltage output on the X, Y and Z magnetic axes (see FIG. 2 in this regard). For example, a mobile barrier transfer and transport machine (TTM) manufactured by Barrier Systems Inc., Rio Vista, Calif. employs X, Y and Z signal components to autosteer the machine and control operation of a capstan system employed therein. The fluxgate magnetometers referenced above produce primary and reference signals having magnetic axis X, Y and Z signal components.

With additional reference to FIGS. 4 and 4A–4D which disclose a signal processor circuit suitable for use when practicing this invention, the magnetic axis X signal component of the lower sensor 22 is fed into the positive input of instrumentation amplifier U3. The amplifier is configured to have a gain of 2. The output is the difference between the two sensors. The output is directed to an absolute value amplifier, consisting of U4-A3 and U4-A4.

Both the magnetic axis Y and Z signal components are processed by instrumentation amplifiers, as explained above. The Y signal is also processed by an absolute value amplifier, consisting of U4-A1 and U4-A2. The Z channel is not processed by an absolute value amplifier, because it is necessary to sense when the signal changes from a positive to negative polarity.

All three signals are then added in an inverting summer, U7-A1. The signal is then inverted by a unity gain amplifier, U7-A2, to prepare it for the next stage. U8 is an analog divider that divides the X error signal with the output of the three summed channels. The signal is fed to analog single pole double throw switch integrated circuit U11. When there is not a valid signal present, the switch grounds the input to amplifier U7-A3, thus insuring that the output is at zero volts or 12 milliamps. When a valid signal is present, it is passed through the switch to U7-A3. This is followed by an adjustable gain stage, U7-A3. The output is a bi-polar signal representing how far left or right of the magnetic tape the sensors are. This signal is useful for trouble shooting or feeding to a data acquisition system for further study, or being used directly to drive a hydraulic proportional valve. The signal is also fed to a level shifting and gain adjusting amplifier to condition the signal for the next stage. This is amplifier, U7-A4. With +/−15 volts in, the latter amplifier produces an output of 0–10 volts. The last stage is a converter that will take the 0–10 volt input signal and output an industry standard 4–20 milliamp current signal. This current error signal or the +/−10 volt signal from U7 or U15 is fed to a steering processor associated with the vehicle automatic steering system.

Additional circuits are included to produce logic signals for both the steering system and an automatic capstan system of the type employed, for example, on a barrier transfer and transport machine (TTM), manufactured by Barrier Systems Inc., Rio Vista, Calif. employed to pick-up and transfer barriers also manufactured by that company. The Z signal is amplified by 5× in a non inverting amplifier, U10-A1. This is fed into voltage comparator U5. A reference voltage is applied to the other input terminal of the comparator. The output is either 0 or +15 volts. When the Z signal is greater than the reference signal the output goes high. This signal is sent to a programmable logic controller in the automatic steering system to tell the system that the magnetic tape has been detected and it is safe to start automatic steering.

A second comparator circuit, U6, is used to send a logic signal to the automatic capstan system whenever the sensors pass over a high field strength cylinder magnet. These magnets can be used as road "benchmarks", along with RF ID tags, to tell the automatic capstan computer where the machine is on the course.

Comparator circuits U12 & U13 are used to detect whether a sensor has failed. The APS sensors put out a logic 1 if the sensor is O.K. This will light a green light emitting diode. If the sensor internal circuit determines that one or more of the channels has a problem, the output will go low, thus extinguishing the green LED.

Analog switch U14 is only included on the board for specific sensor layouts and has no functional significance to the operation of the processing circuit.

Power for the integrated circuits and magnetometers is supplied by power supply PS1. It is a modular supply that converts +12 volts, supplied by the machine battery, to +&−15 volts.

The invention claimed is:

1. Apparatus for use in guiding a vehicle on a roadway along an elongated guide member emitting a magnetic field, said apparatus comprising, in combination:

a first sensor attached to the vehicle for detecting both the magnetic field emitted by the elongated guide member and an ambient magnetic field not emitted by the elongated guide member, said first sensor producing a primary signal representative of the detected magnetic field emitted by the elongated guide member and the ambient magnetic field;

a second sensor attached to the vehicle for detecting the ambient magnetic field but not a substantial portion of the magnetic field emitted by the elongated guide member, said second sensor producing a reference signal representative of the ambient magnetic field; and a signal processor for processing the primary and reference signals to subtract the reference signal from the primary signal and produce a steering signal for transmission to an automatic steering system on said vehicle.

2. The apparatus according to claim 1 wherein said first sensor and said second sensor are elevated relative to said elongated guide member, said second sensor being elevated relative to said first sensor.

3. The apparatus according to claim 2 wherein said sensors are aligned along a substantially vertical axis.

4. The apparatus according to claim 1 wherein said first and second sensors comprise fluxgate magnetometers.

5. The apparatus according to claim 1 wherein said first and second sensors respectively produce primary and reference signals having a plurality of signal components and wherein said signal processor includes a plurality of signal converters for receiving separate signal components.

6. The apparatus according to claim 5 wherein said first and second sensors respectively produce primary and reference signals having magnetic axis X, Y and Z signal components, one of said signal converters receiving the X signal components of said primary and secondary signals and producing an output that is the difference between the received X signal components, one of said signal converters receiving the Y signal components of said primary and secondary signals and producing an output that is the difference between the received Y signal components and one of said signal converters receiving the Z signal components of said primary and secondary signals and producing an output that is the difference between the received Z signal components.

7. The apparatus according to claim 1 wherein said signal processor includes at least one signal converter having a positive input for receiving at least a portion of the primary signal from said first sensor and a negative input receiving at least a portion of the reference signal from said second sensor and producing an output that is the difference between the inputted signals.

8. The apparatus according to claim 7 wherein said at least one signal converter comprises an amplifier.

9. The apparatus according to claim 6 wherein each of said signal converters comprises an amplifier.

10. The apparatus according to claim 1 including mounting means affixed to said first and second sensors to maintain a predetermined fixed distance between said first and second sensors and maintain said first and second sensors in alignment.

11. A method employed when guiding a vehicle on a roadway along an elongated guide member emitting a magnetic field, said method comprising the steps of:

attaching a first sensor to the vehicle;

attaching a second sensor to the vehicle;

maintaining said first sensor and said second sensor spaced from one another;

during movement of said vehicle on the roadway detecting at said first sensor both the magnetic field emitted by the elongated guide member and an ambient magnetic field not emitted by said elongated guide member;

producing at said first sensor a primary signal representative of the detected magnetic field emitted by the elongated guide member and the ambient magnetic field;

during movement of said vehicle on the roadway, detecting at said second sensor the ambient magnetic field but not a substantial portion of the magnetic field emitted by the elongated guide member;

producing at said second sensor a reference signal representative of the ambient magnetic field;

processing the primary and reference signals to subtract the reference signal from the primary signal; and subsequent to said processing step, producing a steering signal for transmission to an automatic steering system on said vehicle.

12. The method according to claim 11 wherein said first sensor and said second sensor are maintained in an elevated condition relative to said elongated guide member during movement of said vehicle.

13. The method according to claim 12 wherein said second sensor is maintained elevated relative to said first sensor and maintain a fixed distance from said first sensor during movement of said vehicle.

14. The method according to claim 13 wherein said first and second sensors are maintained in alignment along a substantially vertical axis during movement of said vehicle.

15. The method according to claim 11 wherein the step of producing a primary signal includes producing a plurality of primary signal components and wherein the step of producing a reference signal includes producing a plurality of reference signal components.

16. The method according to claim 11 wherein the step of producing a primary signal includes producing magnetic axis X, Y and Z primary signal components and wherein the step of producing a reference signal includes producing magnetic axis X, Y and Z reference signal components.

17. The method according to claim 11 wherein said processing step includes inputting at least a portion of the primary signal from the first sensor into a first input of a signal converter, inputting at least a portion of the reference signal from the second sensor into a second input of a signal converter and producing an output at said signal converter that is the difference between the inputted signals.

18. The method according to claim 16 wherein said processing step includes introducing the X primary signal component and the X reference signal component into inputs of a first signal converter and producing an output that is the difference between the X primary signal component and X reference signal component, introducing the Y primary signal component and the Y reference signal component into the inputs of a second signal converter and producing an output that is the difference between the Y primary signal component and the Y reference signal component, and introducing the Z primary signal component and Z reference signal component into the inputs of a third signal converter and producing an output that is the difference between the Z primary signal component and the Z reference signal component.

* * * * *